Aug. 17, 1948.    P. HOLCOMB, JR    2,447,069
SIGNALING BUOY
Filed Feb. 5, 1940    3 Sheets-Sheet 1
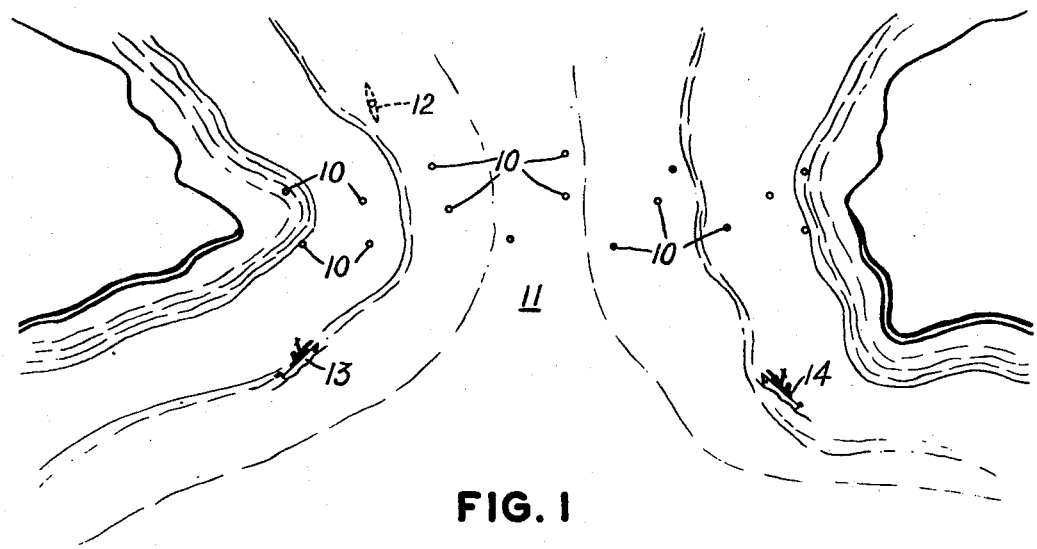
FIG. 1
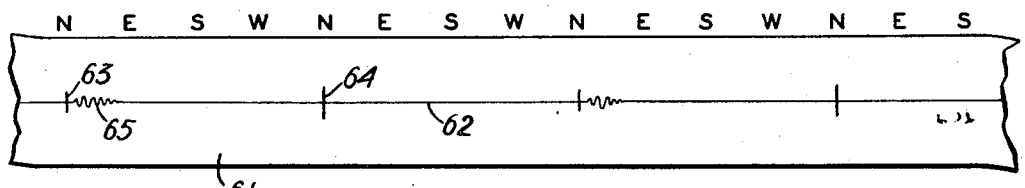
FIG. 4
FIG. 5
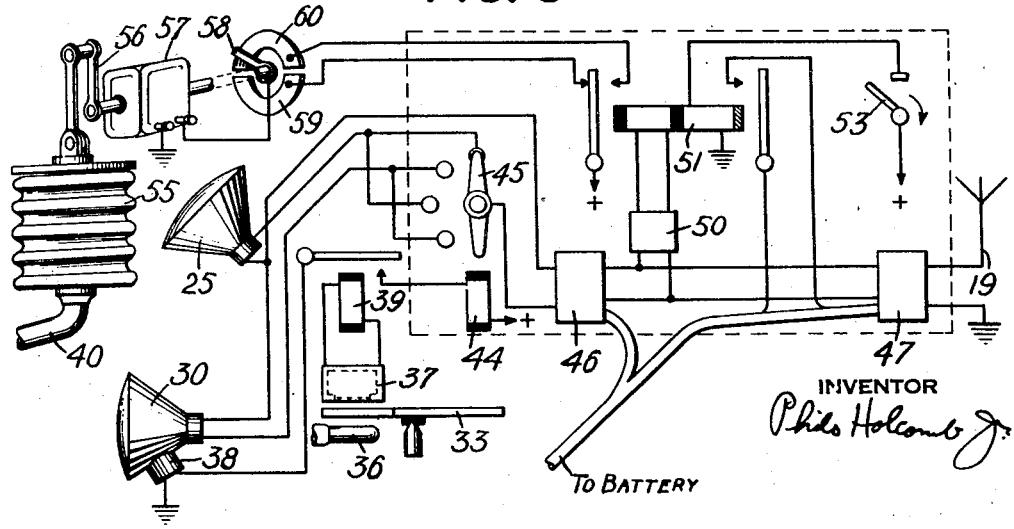
INVENTOR
Philo Holcomb Jr.

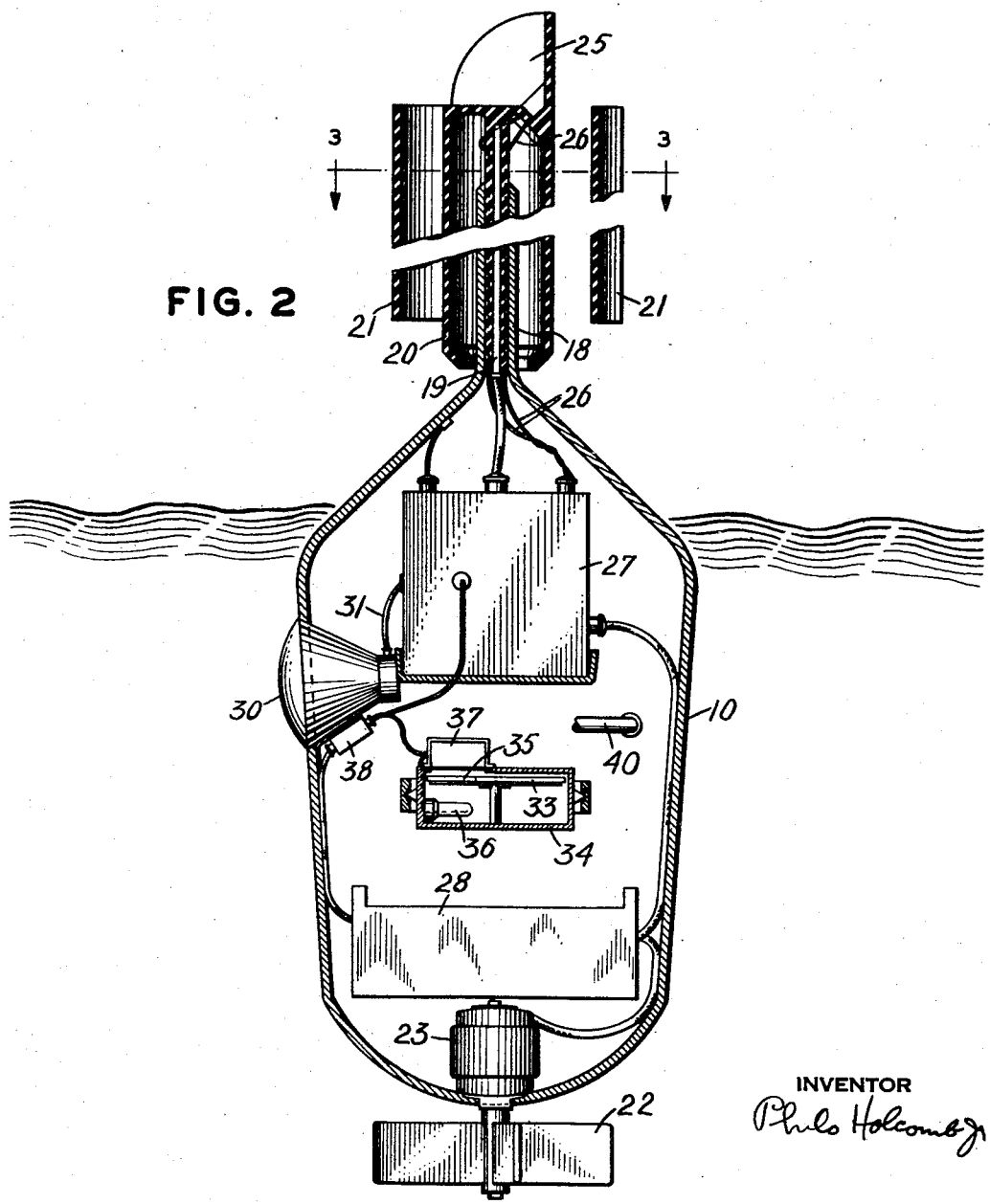

Aug. 17, 1948.   P. HOLCOMB, JR   2,447,069
SIGNALING BUOY

Filed Feb. 5, 1940   3 Sheets-Sheet 3

INVENTOR
Philo Holcomb Jr.

Patented Aug. 17, 1948

2,447,069

UNITED STATES PATENT OFFICE 2,447,069

SIGNALING BUOY

Philo Holcomb, Jr., Great Neck, N. Y.

Application February 5, 1940, Serial No. 317,263

11 Claims. (Cl. 177—386)

This invention relates to systems and apparatus for picking up and transmitting information from points at sea, more particularly involving the use of floating buoys or stations.

The detection of enemy ships or aircraft during time of war is an important application of the invention. Patrol boats or aircraft have a relatively small range of observation compared to the ocean or channel areas sought to be protected and are often eluded by enemy craft. Meteorological conditions over wide expanses of the ocean also are often of vital importance to aviation or the conduct of war, and hitherto information as to these conditions has often been lacking on account of the absence of ships or airplanes in a particular area.

The object of the invention, in general terms, is to overcome the limitations of patrol craft or observation planes used to detect enemy ships or aircraft, to report meteorological conditions at sea or for other purposes.

Another object of the invention is to provide a simpler and more effective means to prevent the undetected passage of submarines and other craft through guarded or forbidden ocean areas and to give bearings on such craft that will cause them to be accurately located, even from a great distance.

A further object of the invention is to provide an improved radio signalling apparatus adapted for use at sea and employed for the purpose of relaying information respecting conditions adjacent the apparatus to a ship or shore receiving station.

A further object of the invention is to render apparatus of the above-noted character practically impossible to detect and destroy. This is accomplished, in accordance with the invention, by automatically submersing the buoys when they are inoperative or whenever desired.

Other objects and advantages of the invention will become apparent from the following description of the embodiments thereof shown in the accompanying drawings, wherein Fig. 1 is a view illustrating the use of a plurality of sentinel buoys to protect a channel or strait in accordance with the invention;

Fig. 2 is a vertical sectional view of a radiant-energy transmitter buoy adapted for use as illustrated in Fig. 1;

Fig. 3 is a sectional view taken on the line III—III of Fig. 2;

Fig. 4 shows a portion of one of the record tapes produced at a distance by the signals from the buoy;

Fig. 5 is a diagram of the control and transmitting equipment in the buoy;

Figure 6:
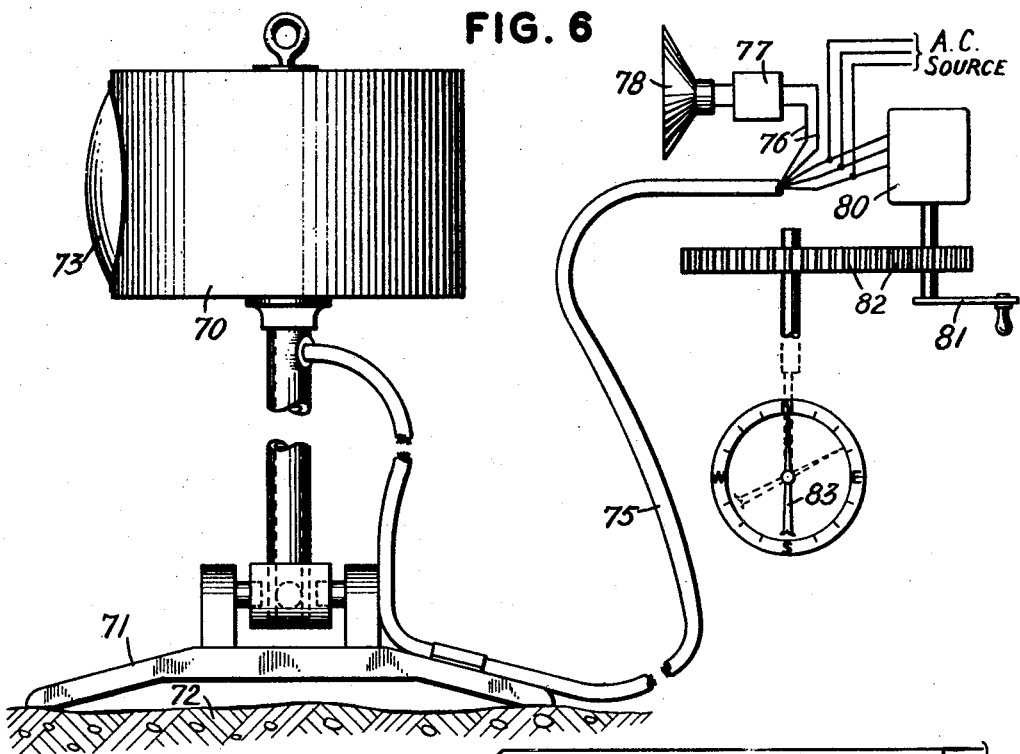
Fig. 6 illustrates a stationary buoy connected through a cable to the receiving station.

Referring to Fig. 1 of the drawings, the invention contemplates the use of a plurality of sentinel buoys 10, either anchored or adrift, for protecting a strait or channel 11 against enemy aircraft or boats. The term "buoy" as used herein includes equivalent floating objects such as rafts or floats. A submarine attempting to pass through the strait 11 is represented at 12. Two control or receiving stations are represented by the mother ships 13 and 14 although these stations or other stations might be located on land.

The buoys 10 may be provided with means for picking up the sounds originating in the submarine 12 (or from passing aircraft) and for transmitting signals by radio to the ships 13 and 14, as will be explained in connection with Figs. 2-5 illustrating the detailed construction of the buoys. The receiving stations are preferably provided with radio direction finder equipment to detect the signals and to determine by triangulation the approximate positions of the buoys. The location of the enemy craft having been determined, the active area can be shelled or fast boats or aircraft can be dispatched to disable or sink the submarine. It will be apparent that by the use of the invention large areas can be effectively guarded against intrusion.

The location of the enemy aircraft or boat by several buoys gives extremely accurate guidance for shell fire or dropping depth charges. The positions of drifting buoys may be accurately located off shore by firing a shell or two in their midst, observing the explosion from two land observation stations and checking the character of the resulting signal records. The sides of the buoys are preferably numbered or bear identifying marks to aid in locating them, or the subchaser or plane may follow the radio beam from each buoy in order to locate the position of the submarine or enemy aircraft.

The sentinel buoys each include essentially sound pickup apparatus for undersea sounds or aircraft or both, and a small, self-contained radio transmitter, and are thus much simpler than a patrol boat or airplane and do not have to be manned. A large number of buoys may be constructed and placed in service in a comparatively short time and at low cost. A preferred construction is shown in Figs. 2 and 3, and comprises a hollow water-tight casing having a vertical, upstanding neck portion 18 supporting an insulated conductor 19 forming a radiating antenna for a radio transmitter. The antenna is surrounded by an insulating splash shield or petticoat 20 which may be closely spaced from the bottom of the antenna, as shown, to trap air inside of the shield in the event that the lead is immersed in the water and thereby prevent wetting of the insulated lead along its entire length. The shield 20 is also provided with wind vanes 21 shaped to rotate the buoy in the water when the wind impinges on said vanes. The rotation of the buoy makes it responsive to sounds in all directions and is used to vary the signals transmitted so that the receiving station can tell the direction of the submarine from the buoy, as will be explained. A rotating fin or paddle-wheel 22 driven by a slow-speed motor 23 is also provided to continually rotate the buoy 10 about its vertical axis at a slow rate. If desired, one of the means shown for rotating the buoy may be omitted.

In order to pick up air-borne sounds, such as those emanating from an airplane propeller in the vicinity, an aerophone 25 containing a microphone or other sound-responsive device is mounted above the normal water level, for example on the shield 20. The aerophone 25 is connected by conductors 26 to the radio transmitter 27 in the usual manner whereby the sounds picked up will be broadcast when the transmitter is operative. Power for operating the transmitter and associated equipment is obtained from a battery 28. In addition to the aerophone, a hydrophone 30 connected by conductors 31 to the transmitter is provided to detect sounds passing through the water.

Since the aerophone and hydrophone are directional, as the buoy is rotated, means is provided for indicating at the receiving station the direction with respect to north-and-south or other fixed reference plane in which the sounds received from the submarine or aircraft are strongest as the buoy turns around its axis. In its preferred form, this comprises a compass card 33 mounted in a casing 34 supported on gimbals. The compass is compensated for local magnetic variations in the usual manner. The compass card is provided with a radial slot 35 through which light may pass from the light source 36 to the photo-sensitive device or photo-electric cell 37 at one point in each revolution of the buoy and always when the aerophone 25 and hydrophone 30 are oriented in a predetermined direction. The cell 37 is connected, through a relay if desired, to a buzzer 38, preferably mounted on the hydrophone 30 whereby the latter is actuated momentarily by the vibration or tone of the buzzer to transmit a signal indicative of the angular position or orientation of the buoy at that moment. This signal will also be picked up faintly by the aerophone 25 and if the hydrophone and aerophone are connected alternately to the radio transmitter, the received signal will indicate which sound-detecting unit is operative. The intermittent operation of the buzzer also serves to show that the parts of the buoy are in good condition and ready for service.

The casing of the buoy may further be provided with an inlet and vent pipe 40 through which water may be admitted when it is desired to submerse the buoy, for example to render the same substantially invisible during the daytime in a manner to be described below.

A preferred circuit diagram of the control and transmitting apparatus of the buoy is shown in Fig. 5. Referring to this figure of the drawings, the periodic energization of the photocell 37 and associated relay 39 causes the intermittent operation of the buzzer 38, as described, and also the stepping of the step-by-step rotary switch comprising operating magnet 44 and switch wiper 45 actuated thereby. As shown, the magnet 44 is in series relation with the contacts of relay 39 and the buzzer 38. The step-by-step switch may be of the conventional type wherein the movement of the switch wiper 45 from one bank contact to the next is produced by a retractile spring when the magnet 44 is deenergized. The bank contacts of the switch are connected alternately to the aerophone 25 and hydrophone 30 so that during one revolution of the buoy by the wind vanes 21 or rotator element 22 the aerophone 25 is connected to the amplifier 46, and during the succeeding revolution the hydrophone 30 is connected to said amplifier. The output circuit of the amplifier 46 is connected to a band pass filter 50 and the oscillator or transformer 47. The filter 50 passes a frequency band that will include the predominating frequencies in seacraft and aircraft propeller noise and thus energizes an alternating-current slow-release relay 51 arranged to close through its right hand contacts the filament-heating circuit of the oscillator 47. The oscillator is thus selectively rendered operative upon the occurrence of sounds or noise of the character which the buoy is designed to detect, and transmits signals only upon the occurrence of such sounds or noise.

In order to protect the buoy against destruction by the enemy, provision is made for submersing the buoy so that it becomes practically invisible. As shown, the buoy remains substantially submersed until it is set in operation by the signal control mechanism, for example in response to the occurrence of propeller or engine noise from a ship or aircraft in the vicinity. Referring to Fig. 5, the mechanism for submersing the buoy comprises a pump or expansible chamber device 55 connected to the crank arm 56 of an electric motor 57 in such a manner that as the arm 56 turns, water is expelled or drawn in through the pipe 40 to raise or lower the buoy in the water in accordance with the position of said arm. In the position shown, the volume of the chamber 55 is a maximum and, since it is filled with water, the added weight causes the buoy to sink (until only the aerophone 25 is above the water, if desired). When the crank arm 56 is turned through an angle of 180°, the water in the chamber 55 is partly expelled and the buoy rises.

As shown, a contact brush arm 58 in the circuit of the motor 57 is mounted on the shaft of the motor carrying the crank arm 56, said brush arm 58 engaging two semi-circular contact segments 59 and 60 connected respectively to the back and front contacts associated with the left hand armature of relay 51. Thus the energization of the relay 51 upon the approach of a submarine, airplane or other craft, as described, closes the circuit of the motor 57 until the crank arm 56 is turned through an angle of 180° (to expel the water in the chamber 55 and cause the buoy to rise to its normal signalling position in the water). The circuit of the motor 57 is interrupted at this point by the disengagement of the brush arm 58 from the contact segment 60 and a circuit is closed through the contact segment 59 to the back contact of relay 51. When said relay subsequently becomes de-energized, the motor completes its cycle, the chamber 55 is enlarged by the movement of the crank arm 56 to the position shown and the buoy is submersed in the water until sound is again picked up by the buoy.

The buoy may also be arranged to rise in the water and transmit its carrier at predetermined times for testing purposes, as for example, by clock-operated contacts 53 shown in the circuit of a second winding of relay 51. The operation of the system resulting from the closure of the contacts 53 is similar to that caused by the operation of relay 51 in response to current flowing through the filter 50.

At the receiving station, conventional tape-recording or other receiving apparatus is used to determine the direction and character of the radio signals transmitted from each sentinel buoy. The oscillators in the respective buoys in a particular locality are preferably adjusted to radiate carrier waves of different frequencies so that the buoys may be identified by the mother ships or other receiving station. Fig. 4 shows a typical tape record 61 of signals from an active buoy. The line or trace 62 on the tape contains marks 63 and 64 representing the signals generated by the buzzer 38 at a predetermined orientation of the buoy when the aerophone 25 and hydrophone 30, respectively, are operative (the signal 64 of greater amplitude representing the signal picked up by the hydrophone upon which the buzzer 38 is mounted). The trace 62 also contains a variable portion 65 representing the sound picked up by the hydrophone which is connected in circuit immediately after the "buzz" signal 63 from the aerophone. Since the marks 63 and 64 are produced when the sound pickup devices 25 and 30 are pointed in a predetermined direction, as indicated, the relation of the peak of the signal 65 to the marks 63 and 64 not only show whether the sounds are being detected through the water or through the air (in this instance through the water) but also the direction from which the propeller sounds are received strongest. This indicates at the receiving station, the direction of the intruding craft from the buoy at the instant signals are transmitted and, from the changes in the signals, the progress of the craft. Similar tape records are produced by receivers tuned to other buoys or by tuning a single receiver to different buoys. The direction of active buoys is readily determined by using directional receiving apparatus and by comparison of the records made of signals from two or more buoys, the position of the intruder can be quickly determined. This feature of the invention whereby not only the character and strength of the sounds picked up by the sentinel buoys but also their direction are radiated on a carrier wave from the buoys is an important one. The effectiveness of the apparatus for its intended purpose is greatly enhanced without substantially complicating the construction or the method of operation.

The construction of the buoy will be greatly simplified if certain of the parts shown are omitted. Thus if the buoy is to be used as a simple submarine detector in a windy region, the rotator wheel 22, motor 23, aerophone 25, switch 45, filter 50, relay 51, clock 53 and submersing apparatus 55—60 can all be omitted. For use in shallow water, for detecting submarines, a construction similar to that shown in Fig. 6 may be anchored near the surface or resting on the bottom. This arrangement comprises a water-tight casing 70 containing control and sound-detecting apparatus, and rotatively supported on a base 71 adapted to rest on the bottom 72. If the casing 70 is anchored and designed to float between the bottom and the surface of the water, the base 71 is omitted. A hydrophone 73 is mounted in a wall of the casing 70. A cable 75 for supplying power to the sound detecting and amplifying apparatus and power for rotating the casing 70 is connected between the casing and the ship or shore receiving station. At the latter station, the conductors 76 of the cable 75 are connected to an amplifier 77 and sound reproducer 78 to reproduce sounds picked up by the hydrophone 73. In order to rotate the casing 70, suitable means such as "Selsyn" motors may be employed, the transmitting motor 80 being shown connected to the cable 75 and an alternating current, three-phase source. The rotor of the motor 80 is connected to a manually operable lever 81, the adjustment of which determines the angular position of the casing 70 by the receiving motor of the "Selsyn" system as well understood by those skilled in the art. The handle or control lever 81 may be connected through gears 82 to a pointer 83 to indicate at the control station the direction towards which the hydrophone 73 points. This construction provides a simple and effective directional sound detector for submarines and ships, and is of particular advantage for use in home waters when it is desirable not to broadcast the presence of home shipping.

Instead of utilizing a rotating hydrophone or sound-pickup device to determine the direction in which the boat or aircraft noise originates, two or more fixed sound-pickup devices arranged at an angle to each other may be employed and the volume of sound detected by each device compared. In addition to or instead of using the sentinel buoys to direct subchasers or shell fire to the scene, they may be connected to mines which are set off when the submarine is heard.

Figure 7:
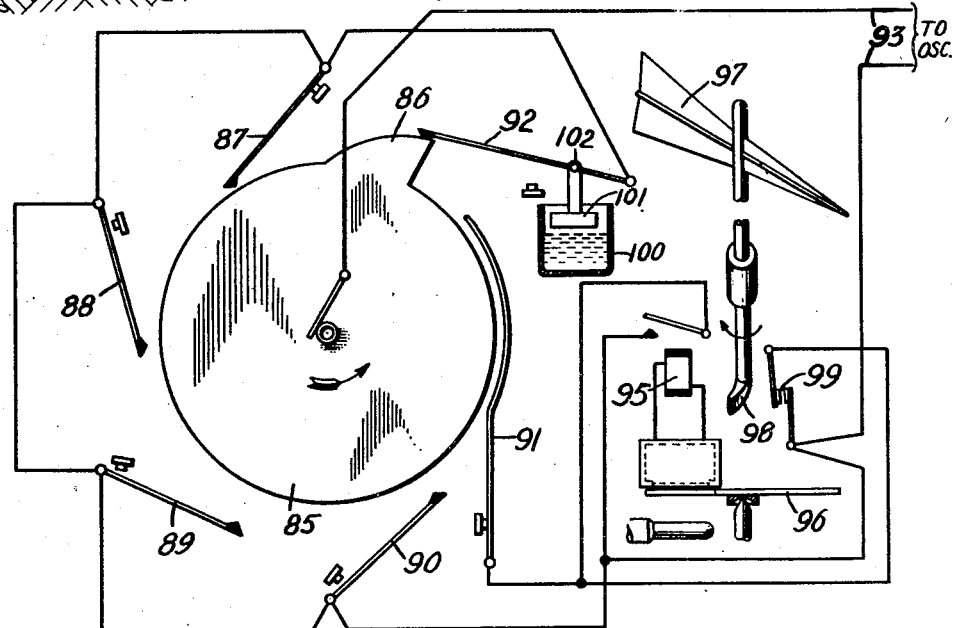
Fig. 7 illustrates control apparatus adapted to transmit signals representing meteorological conditions in the vicinity of a buoy.

The same principles may be employed for obtaining and transmitting meteorological data. The apparatus and circuits of a buoy to be used for this purpose are shown in Fig. 7. The system comprises a slowly rotating disc 85, driven by a motor or clock-work mechanism, provided with a cam 86 arranged to close successively the circuits of several devices arranged to indicate or measure the weather conditions, such as rainfall, barometric pressure, wet and dry bulb temperatures, brightening of sky, wind velocity, et cetera. As shown, a plurality of pivoted rods or pointers 87, 88, 89 and 90 are arranged in the path of the cam 86 and each of said pointers, when engaged by said cam, completes a circuit through conductors 93 to the oscillator to transmit a carrier wave of suitable frequency as long as the circuit is closed. Assuming that each pointer is deflected from its associated stop in accordance with the magnitude of the temperature, pressure or other condition being measured, it will be apparent that the duration of the signal transmitted at each point in the cycle of operation will be a measure of one of said conditions. While the cam 86 is in engagement with the spring-pressed contact member 91, an indication will be given of wind direction and velocity, assuming that the buoy is rotated by wind vanes such as those indicated at 21, Figs. 2 and 3. Once in each revolution of the buoy, the relay 95 is energized by the passage of light through a slot in the compass card 96 upon the photocell connected to said relay. The circuit of the oscillator is then closed through the contacts of said relay and the contact member 91. The frequency of the signals produced in this manner is dependent upon the wind velocity. A weather vane 97 is also provided and, as the buoy rotates relative to said vane, a cam 98 on the shaft of the weather vane closes the contacts 99 in parallel to the contacts of relay 95. The signal transmitted by this closure of contacts 99 may be distinguished from that resulting from the operation of relay 95 by making the contacts 99 close for only a short interval. The wind direction is obtained from the time relation between the weather vane and compass signals.

In order to measure rainfall, a cup 100 is provided into which rain is diverted, the cup being arranged to empty itself when full in a way well known to the art. A float 101 in said cup is pivotally connected at 102 to the pointer 92 cooperating with the cam 96 to send a signal varying in length in accordance with the position of float 101 (corresponding to the amount of rainfall since the cup 100 was emptied). Obviously any condition which may be translated into varying positions of an arm or pointer may be transmitted automatically to radio receiving stations in the manner described.

While specific embodiments of the invention have been shown and described in detail for the purpose of explaining the invention, it is not limited thereto. The scope of the invention is defined in the appended claims.

I claim:

1. A signaling buoy comprising a hollow watertight casing, means including a radio transmitter to radiate signals corresponding to sounds impinging on said buoy from aircraft or watercraft, a ballast chamber in said casing, motor means to fill said ballast chamber and thereby at least partially submerge said buoy, and means to operate said motor means to empty said ballast chamber in response to propeller sounds and the like in the vicinity.

2. A signaling buoy comprising a hollow watertight casing, means to rotate said casing in the water about a vertical axis, means including a radio transmitter to radiate signals corresponding to sounds impinging on said buoy from aircraft or watercraft, said last-mentioned means including an aerophone and a hydrophone, and means controlled by the rotation of the buoy to switch the transmitter from the aerophone to the hydrophone.

3. A signaling buoy comprising a hollow watertight casing, means to rotate said casing in the water about a vertical axis, directional sound pick-up means including an aerophone and a hydrophone, a radio transmitter controlled thereby and means to render the aerophone and hydrophone alternately operative on alternate revolutions of said casing.

4. A signaling buoy comprising a hollow watertight casing, means to rotate said casing in the water about a vertical axis, means including a radio transmitter to detect and signal the presence of nearby craft by signals varying with changes in the position of the tuning buoy, and means to render the transmitter operative and to elevate the antenna thereof upon the approach of said craft.

5. A signaling float or buoy comprising a radio transmitter, a directional pickup microphone connected thereto, means for rotating said microphone, a noise-making device, a direction-indicating device or compass, and means controlled by relative movement between said microphone and said compass for controlling the noise-making device to produce a signal indicating direction of pickup.

6. A signalling buoy comprising a hollow watertight casing which is normally submerged in water to a predetermined extent, a radio transmitter in said casing, a sound-pickup device carried by said casing and connected to control said transmitter, and means controlled by said sound-pickup device upon receipt of sounds of a predetermined character for increasing the buoyancy of said buoy and thereby causing the same to extend further out of the water.

7. A signalling buoy according to claim 6 wherein said watertight casing is provided with a ballast chamber which is normally filled with water, and including motor means controlled by said sound-pickup device for expelling the water from said ballast chamber.

8. A signalling system having a signalling buoy according to claim 3 and including a receiver for receiving signals transmitted by said radio transmitter, and means for recording said signals on a single linear record, whereby alternate linear sections of said record contain the record of signals picked up by said aerophone and hydrophone, respectively.

9. A maritime observation system of the character described comprising, detection means responsive to vibrations emanating from a vessel in motion, wireless transmission means actuated by the detection means and adapted to transmit a signal to a distant point, said transmission means being positioned normally below the surface of the sea, means for moving said transmission means to the surface of the sea for transmission of said signal, and means for moving said transmission means to its normal position after transmission of said signal.

10. A maritime observation system of the character described comprising, detection means responsive to vibrations emanating from a vessel in motion, wireless transmission means actuated by the detection means and adapted to transmit a signal to a distant point, said detection and transmission means being contained in a single normally submerged unit, means for moving said unit to the surface of the sea for transmission of said signal, and means for moving said unit to its submerged position after transmission of said signal.

11. A maritime observation device of the character described comprising detection means responsive to vibrations emanating from a vessel, radiant-energy signalling means controlled by said detection means and operating to transmit a signal to a distant point upon receipt of said vibrations, said signalling means normally being maintained at a predetermined elevation with respect to the surface of the sea, and means for elevating said signalling means from its normal position for transmission of said signal and for thereafter returning said signalling means to its normal position.

PHILO HOLCOMB, Jr.

REFERENCES CITED

The following references are of record in the file of this patent:

UNITED STATES PATENTS

| Number | Name | Date |
| --- | --- | --- |
| 122,437 | Chester | Jan. 2, 1872 |
| 1,287,908 | Delany | Dec. 17, 1918 |
| 1,310,563 | Ellis | July 22, 1919 |
| 1,411,948 | Williams | Apr. 4, 1922 |
| 1,426,337 | Sperry | Aug. 15, 1922 |

(Other references on following page)

| Number | Name | Date |
|---|---|---|
| 1,610,779 | Hewett | Dec. 14, 1926 |
| 1,669,055 | Hogg | May 8, 1928 |
| 1,732,690 | Marsteller | Oct. 22, 1929 |
| 1,822,683 | Wilde | Sept. 8, 1931 |
| 1,928,969 | Kuffel | Oct. 3, 1933 |
| 1,973,673 | Rice | Sept. 11, 1934 |
| 2,049,588 | Leib | Aug. 4, 1936 |
| 2,115,787 | Runge | May 3, 1938 |
| 2,118,082 | Hammond | May 24, 1938 |
| 2,138,668 | Stewart | Nov. 29, 1938 |
| 2,147,148 | Charrier | Feb. 14, 1939 |
| 2,177,493 | Koulichkov | Oct. 24, 1939 |

FOREIGN PATENTS

| Number | Country | Date |
|---|---|---|
| 3,696 | Great Britain | Mar. 6, 1919 |
| 317,881 | Germany | Jan. 6, 1920 |
| 339,456 | Great Britain | Dec. 11, 1930 |
| 421,418 | Germany | Nov. 14, 1925 |
| 523,880 | Germany | Apr. 29, 1931 |
| 596,439 | Germany | May 3, 1934 |

OTHER REFERENCES

Field Engineers Bulletin, vol. 10 (1936), pp. 147–149, an article by George D. Bowie entitled "Sono radio buoy."